May 9, 1967
J. S. GERIG
3,319,076
MAGNETIC MODULATOR
Filed May 28, 1963
2 Sheets-Sheet 1
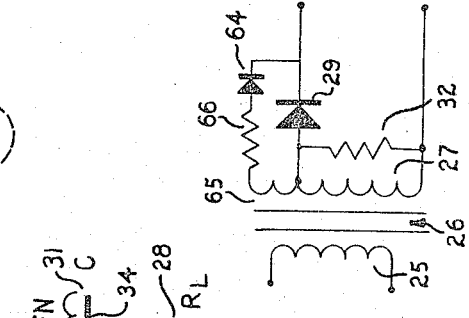
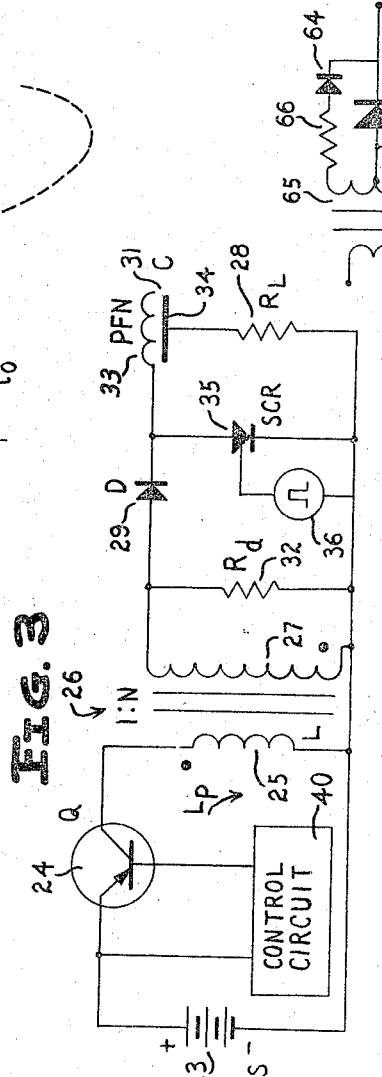
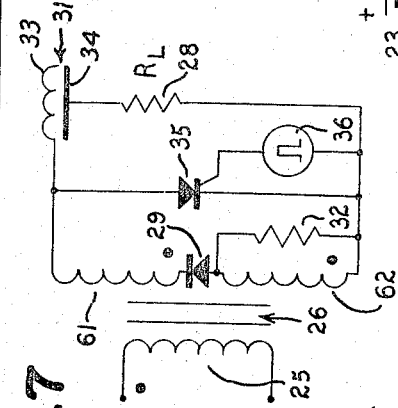
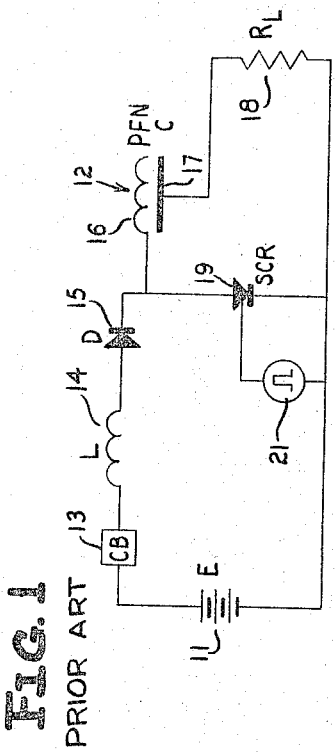
INVENTOR
JOHN S. GERIG
BY *Hurvitz & Rose*
ATTORNEYS May 9, 1967    J. S. GERIG    3,319,076
MAGNETIC MODULATOR
Filed May 28, 1963    2 Sheets-Sheet 2
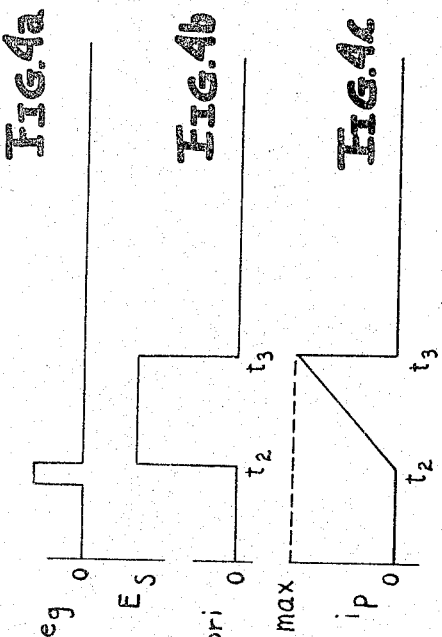
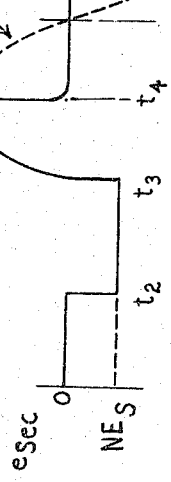
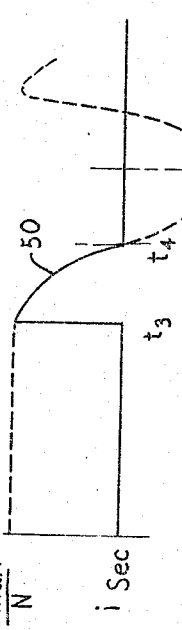
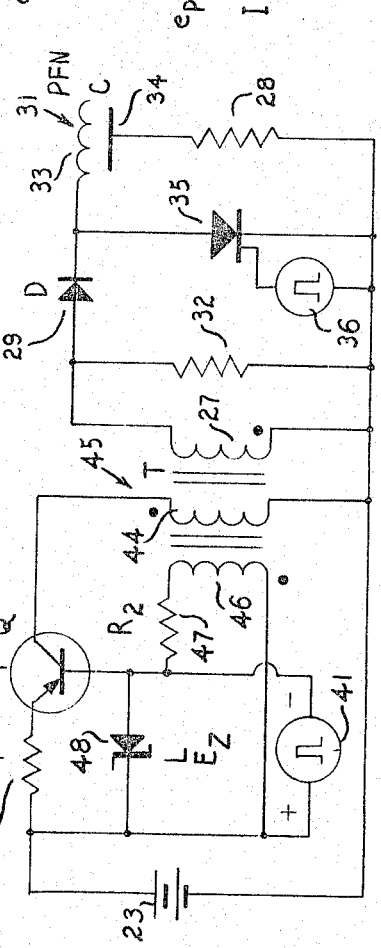
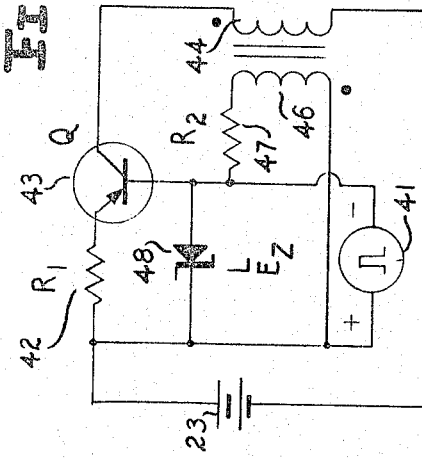
INVENTOR
JOHN S. GERIG
BY Hurvitz & Rose
ATTORNEYS United States Patent Office 3,319,076
Patented May 9, 1967

3,319,076
MAGNETIC MODULATOR
John S. Gerig, McLean, Va., assignor to Scope Incorporated, Falls Church, Va., a corporation of New Hampshire
Filed May 28, 1963, Ser. No. 283,857
2 Claims. (Cl. 307—88.5)

The present invention relates generally to pulse modulators using pole forming networks, and more particularly to a pulse modulator wherein energy is initially stored in a reactance and is transferred to a load only after the source supplying the reactance with energy is decoupled therefrom.

In supplying large amounts of power for short time durations to loads, such as magnetrons as used in radar transponders, it has been necessary, according to the prior art, to utilize D.C. to D.C. voltage converters for obtaining the required potential values, on the order of hundreds of volts. Such converters are generally power consuming and bulky, conditions undesirable in moblie equipment such as utilized in aircraft.

In the prior art, a pulse forming network connected to the load is discharged by a triggered thyratron or its semiconductor equivalent, in many regards, the silicon controlled rectifier (SCR). Under normal operating conditions, the SCR is able to recover, i.e. cut off, prior to the application of voltage across its anode-cathode path from the high voltage power supply because of the slow sinusoidal rate at which the voltage initially builds up across it. It may occur, however, that recovery of the SCR is not completed at the time that power from the D.C. high voltage source is coupled across its anode-cathode path. In consequence, the SCR remains conducting, a short circuit is produced across the power source, and destructive currents are drawn from the D.C. supply. This problem may be avoided if the anode-cathode voltage of the SCR remains at a zero or negative value for a predetermined time period after the trigger has terminated and thereafter increases at less than a specified rate.

Failure to recover may also result from spurious triggering of the SCR by transient pulses or noise. As in the case of slow recovery, this results in a short circuit across the converter output terminals and destructive currents being drawn from the power supply. To avoid destruction of the power supply, the prior art circuits have required the utilization of mechanical relay or electronic circuit breakers. These breakers are not desirable because the former type degrades circuit reliability while the latter type adds considerably to circuit complexity and cost.

Still a further objection to the prior art circuit is that variations in the D.C. power supplied are reflected in the amount of energy supplied to the load. Poor regulation of the D.C. supply cannot be tolerated because too low a voltage results in insufficient energy to properly activate the magnetron load while too much energy can result in destruction of the load or supply. To overcome this defect the prior art has generally required regulating circuits in the DC. to D.C. inverter, resulting in additional complexity and expense.

According to the present invention the foregoing defects in the prior art circuits are obviated by utilizing a low voltage source that is A.C. coupled through a step up transformer having its secondary winding coupled to the load. Energy is supplied to the primary winding of the step up transformer from the low voltage D.C. source at a time when no energy is supplied by the transformer to the load. At the same time that energy is supplied to the primary, the SCR utilized for discharging a pulse forming delay line in the secondary circuit is triggered. Because voltage applied from the primary circuit or charging transformer across the anode-cathode path of the SCR is zero during trigger pulse application to the gate electrode and for a predetermined time thereafter, recovery of the SCR is insured.

The duration of the wave developed in the secondary is limited to a quarter cycle of the resonant frequency of the secondary winding and the pulse forming network capacitance by a switching diode. After one quarter cycle the secondary current and transformer magnetic field are zero, hence no transients are developed by cutting off the flow of current. To quickly reduce the secondary voltage to zero without overshoot at the end of a quarter cycle, a resistance having a value selected for critical damping is connected to the one of the transformer windings.

Failure of the SCR in the secondary circuit to recover for any reason does not have detrimental effect on the D.C. power supply because the SCR circuit is not D.C. coupled to the power supply.

In accordance with certain modifications of the invention, regulation of the power supplied to the load is automatically controlled by cutting off the switching transistor in the primary winding circuit when a predetermined energy level is attained in coupling transformer. In one embodiment, switching is accomplished in a highly efficient manner by utilization of a saturable reactor which develops an output voltage of sufficient magnitude and of correct polarity to maintain the gating transistor in a conducting state subsequent to the application of a trigger voltage to its base-emitter junction.

In a further embodiment, energy level control is effected by a passive, energy dissipating network including a Zener diode across which is initially developed a voltage of sufficient magnitude to maintain the switching transistor in a conductive state after a trigger pulse has been applied between its base and emitter electrodes. The Zener diode is only switched to its constant potential, low impedance region when the energy supplied to the coupling transformer exceeds a predetermined amount. When the total energy applied to the coupling transformer exceeds this amount, the Zener diode shunts considerable current away from the base-emitter junction of the switching transistor to render the transistor cut off. Hence, in both embodiments a relatively simple circuit is utilized for controlling the energy transfer from the low voltage D.C. supply to the load.

A further feature of the present invention resides in connecting the switching diode between split secondary windings on the charging transformer. This reduces the effective stray capacity of the secondary so that a larger damping resistance may be utilized to achieve greater efficiencies.

Another feature of the present invention is that diode switch off occurs precisely when zero current flows from the secondary, thus avoiding the detrimental transient effects associated with collapsing magnetic fields. In circuits utilizing a high current diode (e.g. 2 amperes capability), as required in the present system, diode switch off occurs when the current reaches a certain negative value because the appreciable positive charge stored at the rectifying junction must be neutralized. With diodes of smaller current capabilities (e.g. 300 ma.), junction charge is virtually negligible so cut off occurs at zero voltage, i.e. there is no need to neutralize charge with a negative current through the anode-cathode path of the diode. I have found that a small diode can be connected to supply negative current through the anode-cathode path of the large diode in a manner to insure current cut off when the net voltage across both diodes is zero. The small diode is connected so it does not draw currents estructive to itself when the large diode is conducting eavily but draws just the right amount of current to compensate for large diode charge storage in the vicinity of ero current.

It is accordingly an object of the present invention to rovide a new and improved circuit for developing high nergy, short duration pulses.

It is a further object of the present invention to provide new and improved system for generating short duration, ligh energy pulses from a low voltage D.C. supply without the intermediary of a D.C. to D.C. converter.

A further object of the present invention is to provide system for delivering high energy, short duration power ulses to load without the necessity of circuit breakers.

An additional object of the present invention is to rovide a new and improved system for delivering high nergy, short duration pulses to a load wherein the charge f a capacitance in a circuit connected to the load is dissipated through a triggered switching device which is cut ff only when the voltage between its anode and cathode eaches a predetermined small value wherein problems isually associated with destruction of the power source ire obviated by decoupling energy from the source to he switch when the switch is triggered.

A further object of the present invention is to provide i new and improved circuit for supplying loads, such as magnetrons, with high energy, short duration pulses wherein transients which normally have a detrimental effect on the operation of a triggered switching device, such as a thyratron or silicon controlled rectifier, do not cause destruction of the power supply.

Yet another object of the present invention is to provide a system for delivering short duration, high energy and well regulated pulses to a load without the need of complex circuitry to regulate the voltage of a power source to the network.

Yet an additional object of the present invention is to provide a new and improved circuit wherein regulation of the amount of power delivered to a load by a high energy, short duration pulse is accomplished through control of the amount of energy supplied to a coupling network rather than of the voltage source applying power to the system.

Yet another object of the present invention is to provide a system for coupling regulated pulses of short duration and of large amplitude to a load wherein regulation is achieved in a highly efficient manner through a reactive rather than a resistive impedance.

An additional object is to provide a circuit for insuring cut off of large current handling diodes precisely when they have zero voltage across them thereby obviating problems usually associated with charge storage at the junction of a semiconductive diode.

A further object of the present invention resides in reducing the capacity of a transformer particularly adapted for pulse type circuits so that large valued resistances may be utilized to provide critical damping.

The above and still further objects, features and advantages of the present invention will become apparent upon consideration of the following detailed description of one specific embodiment thereof, especially when taken in conjunction with the accompanying drawings, wherein:

FIGURE 1 is a circuit diagram of the conventional prior art magnetic modulator;

FIGURES 2A–2C are wave forms to illustrate the manner in which the circuit of FIGURE 1 operates;

FIGURE 3 is a circuit diagram of a preferred embodiment of the present invention;

FIGURES 4A–4E are wave forms utilized to describe the manner in which the circuit of FIGURE 3 operates;

FIGURE 5 is a circuit diagram of a modification of the basic circuit of FIGURE 3;

FIGURE 6 is a circuit diagram of a still further modification of the circuit diagram of FIGURE 3 wherein a saturable reactor is utilized to control switching between a D.C. source and the primary winding of the transformer;

FIGURE 7 is a partial circuit diagram illustrating the manner whereby the effective distributed secondary capacity of the transformer is reduced; and FIGURE 8 is another partial circuit diagram showing how large diode cut off occurs precisely at zero current.

Reference is now made to FIGURE 1 of the drawings wherein D.C. power supply 11, which is generally of the high voltage type, e.g. approximately 500 volts, is connected to a pulse forming network 12 via the series combination of circuit breaker 13, inductance 14 and diode 15. Pulse forming network 12 has a relatively short delay time and is characterized by a small inductance and a large capacitance formed by the dielectric between inductor 16 and electrode 17. Connected between electrode 17 and the negative or grounded terminal of supply 11 is load 18. Load 18 frequently comprises a transformer having a magnetron connected in its secondary winding, the magnetron being reflected as a resistance in the primary winding of the transformer. Connected in shunt with pulse forming network 12 and load impedance 18 is silicon controlled rectifier 19, having its gate electrode responsive to source 21 of pulsating voltage.

In operation, a trigger pulse is applied to the control electrode of silicon controlled rectifier 19, as indicated in FIGURE 2a. The trigger pulse short circuits the end of pulse forming network 12 to discharge the capacitance between coil 16 and electrode 17 to one half of its previously charged value. As the pulse deriving from pulse forming network 12, having a value equal to one-half of the voltage stored across network 12, reaches the short circuit across silicon controlled rectifier 19, a reflection occurs and all of the voltage between coil 16 and electrode 17 is discharged. Hence a very short time period after the initial application of a trigger pulse to the gate electrode of SCR 19, the large capacitance between coil 16 and electrode 17 is completely discharged, as indicated in FIGURE 2b at time $t_0$.

Subsequent to application of trigger pulse 21 to the gate electrode of SCR 19, the SCR remains in conduction until its anode-cathode current drops to a sufficiently low value. Normally this occurs a short time after SCR 19 is originally pulsed, a time equal to twice the delay time of network 12. When SCR 19 is originally pulsed by source 21 there is a tendency for current to flow from power supply 11 through diode 15 to the pulse forming network 12. This tendency is originally blocked by the impedance of inductance 14 so that current through the pulse forming network slowly builds up subsequent to the discharge of the capacitance in network 12 and the voltage across SCR 19 is initially maintained at a low value, as depicted in FIGURE 2b. As additional current is supplied by battery 11 through inductance 14 to pulse forming network 12, charge is accumulated between electrode 17 and inductance 16. As is well known, there is a tendency for sinusoidal oscillations to be established at a frequency determined primarily by the value of inductance 14 and the capacitance of pulse forming network 12. The remaining components in the circuit have virtually no effect on the frequency of the sinusoidal wave because they have negligible impedance compared to that of the aforementioned reactances. When the current through inductance 14 has progressed through one half the cycle of the period for the resonant circuit described, as indicated in FIGURE 2c, and the voltages at the anode and cathode of diode 15 are approximately equal, any tendency of the sinusoidal oscillations to continue further is prevented by diode 15. At subsequent times there is a greater voltage across pulse forming network 12 then across the series combination of battery 11 and inductance 14 so diode 15 is backed biased. In consequence, the flow of current to pulse forming network 12 ceases and the capacitance between coil 16 and electrode 17 is charged to a voltage equal to 2E, E being the voltage of supply 11.

In beacon applications, where the pulse rate applied to the magnetron load 18 may be variable, SCR 19 sometimes fails to recover, i.e. to cut off. Upon such an occurrence inductance 14 is short circuited across supply 11 and considerable current is drawn from the latter. Variations in the characteristics of SCR 19 or the frequency of the sinusoidal wave also can cause short circuiting of source 11 across the SCR and inductance 14. In order for SCR 19 to recover it is necessary that the voltage across its anode and cathode be less than a predetermined value for a specified time after trigger 21 is removed. The waveform of FIGURE 2c marginally fulfills this requirement. To adjust the waveform so that SCR 19 must recover would make the period of oscillation too great for the purpose intended. The magnitude of the short circuit current drawn from supply 11 under both of the foregoing circumstances is frequently sufficiently high to have destructive effects on the supply if circuit breaker 13 were not included in series between it and inductance 14. The circuit breaker 13 is typically either a buzzer connected relay or its electronic equivalent. The mechanical relay ordinarily degrades circuit reliability while the electronic circuit breaker adds complexity and cost to the circuit.

A further disadvantage of the circuit of FIGURE 1 is that it generally requires a D.C. to D.C. converter for power supply 11. It beacon application, such a converter must transform 28 volts into hundreds of volts, a problem beset by high cost and inefficiently operated circuits. For mobile uses, such as aircraft or space vehicles, such complexity and inefficiency are usually undesirable.

To overcome the necessity for circuit breaker 13 and a D.C. to D.C. converter for supply 11, I have invented the circuit of FIGURE 3. In this circuit, low voltage D.C. supply 23 is gated through the emitter-collector path of transistor 24 to the primary winding 25 of transformer 26. The secondary winding 27 of transformer 26 is wound oppositely to that of primary winding 25, as indicated by the dot convention. It is connected to load impedance 28 via diode 29 and pulse forming network 31, connected across shaping resistance 32, having a relatively large impedance.

To remove the charge stored in the capacitance between inductance 33 and electrode 34 of pulse forming network 31, silicon controlled rectifier 35 is connected across the series combination of pulse forming network 31 and load impedance 28. As in FIGURE 1, the load impedance is generally the resistive impedance of a magnetron reflected from the secondary winding to the primary winding of a transformer, as is well known in the art.

In operation, a trigger pulse from the source 36 is applied to the gate electrode of silicon controlled rectifier 35, as indicated in FIGURE 4a. Thereby, cathode-anode path of the SCR is short circuited to discharge the capacitance of pulse forming network 31 in substantially the same manner as the capacitance of pulse forming network 12 of FIGURE 1 is discharged.

At approximately the same time that source 36 supplies a trigger to the gate electrode of SCR 35, the base emitter junction of transistor 24 is forward biased by a negative voltage from control circuit 40 to apply the voltage of source 23 across primary winding 25 in the interval $t_2$–$t_3$. For the entire time period in which transistor gate 24 conducts, the voltage applied to the primary winding 25 equals that of source 23, as indicated in FIGURE 4b. In the same time interval, the voltage across secondary winding 27 is reversed from that across primary winding 25, as indicated in FIGURE 4d to back bias diode 29. Hence, the impedances of pulse forming network 31 and load 28 are not reflected to the secondary winding 27 because of the open circuit impedance of the diode 29, with which they are in series. The impedance of resistance 32 is sufficiently great to be reflected as an infinite impedance across the primary winding 25 so that the latter winding appears essentially as a pure reactance to source 23 and the current build up occurs at a relatively linear rate, as indicated in FIGURE 4c.

It is thus seen that transformer 26 accumulates energy from source 23 for the entire duration of transistorized switch 24 being closed, the final amount of the energy being $LI^2_{max}/2$ where L is the inductance of the primary winding 25 and $I_{max}$ is the magnitude of the current at the instant of transistor 24 cutting off, $t_3$. At the time switching transistor 24 is cut off, flow of current through winding 25 ceases, as indicated at time $t_3$, FIGURE 4c and the energy stored in the magnetic field of transformer 26 is applied to secondary winding 27. As winding 27 absorbs energy from the magnetic field, a positive voltage is induced at the undotted end thereof and current flows from winding 27 to the capacitance of pulse forming network 31.

Hence, a resonant circuit is formed having a frequency determined primarily by the inductance of winding 27 and the capacitance of pulse forming network 31, the impedances of the remaining elements in the circuitry connected to winding 27 having negligible effect on the resonance frequency of the oscillations. The voltage across and current through winding 27 are depicted by wave forms 49 and 50 in FIGURES 4d and 4e, respectively. As energy is withdrawn from the magnetic field surrounding transformer coil 27 and voltage is built up across the capacitance of pulse forming network 31, the current flowing through winding 27 and the pulse forming network decreases from its maximum value of $I_{max}/N$ where N is the ratio between the primary and secondary windings of transformer 26. The current flow in secondary winding 27 jumps to a value equal to $I_{max}/N$ because such a current is necessary to support the magnetic field stored in the core of transformer 26.

The flow of current from secondary winding 27 to the capacitance of pulse forming network 31 continues for only one quarter of a cycle of the sinusoidal waves outlined by reference numerals 49 and 50 in FIGURES 4d and 4e. After one-quarter of a cycle the magnetic field in transformer 26 is zero and the current flow from the pulse forming network to winding 27 is zero and has a tendency to reverse, cutting off diode 29. When diode 29 is cut off and the flow of current from winding 27 to pulse forming network 31 ceases, the voltage across winding 27 drops to zero, as indicated in FIGURE 4d. There is a tendency for the inductance of winding 27 and the distributed capacity of the winding to cause slight ringing, which tends to produce overshoot in the resulting voltage wave form across winding 27. Ringing is prevented by damping resistance 32 connected across winding 27. Resistance 32 is preferably selected to have a value to produce critical damping so that the voltage pulse across winding 27 is reduced to a zero value without oscillations in a minimum time period.

A further advantage of the circuit of FIGURE 3 over that of FIGURE 1 is that the need for D.C. to D.C. converters for source 23 is obviated because of the large voltage increase obtained through transformer 26. Hence, the voltage applied to load 28 has a peak value in the voltage range required for activation of magnetrons through coupling transformers of practical design.

If SCR 35 should fail to recover because of erroneous triggering by noise, for example, the positive portion of wave form 49 in FIGURE 4d is clamped by diode 29 and SCR 35 to a maximum value of several volts only. This condition persists for perhaps 20 to 30 times the duration $t_2$ to $t_4$, during which time the secondary current decays from its initial value $I_{max}/N$ without harm to the circuit or power supply.

To provide automatic regulation of the energy stored in the coupling transformer between the source and load, the input circuitry of FIGURE 5 may be employed. Since the output circuitry associated with secondary winding 27 is essentially the same as in the circuit of FIGURE 3, a further description of this segment of FIGURE 5 is deemed inappropriate.

The input circuit, however, is essentially a triggered blocking oscillator, triggering being effected simultaneously with the application of a trigger pulse from source 36 to the gate electrode of SCR 35. The positive terminal of trigger source 41 is connected via current limiting resistor 42 to the emitter of transistor 43, having its collector connected to one terminal of primary winding 44 of transformer 45. The oppositely wound tertiary winding 46 of transformer 45 is connected between the base-emitter junction of transistor 43 via series resistances 42 and 47, connected to opposite ends of the winding 46. Connected in shunt with trigger source 41 is Zener diode 48 utilized for cutting off transistor 43 at a precise value of collector current.

In operation, source 23 is initially decoupled from winding 44 by the cut off condition of transistor 43. In response to the positive trigger at the emitter of transistor 43, current is supplied from D.C. source 23 to primary winding 44. Application of voltage to transformer 44 from source 23 results in a positive voltage being induced in winding 46 at its dotted end. Hence, the emitter of transistor 43 is biased positively relative to its base and the switch connecting supply 23 to winding 44 remains closed even after termination of pulses from trigger 41. Since at the outset, current and hence voltage drop across resistor 42 are small, Zener diode 48 is back biased to a voltage at which it has a high impedance. Hence diode 48 draws negligible current from winding 46 which supplies sufficient base current to transistor 43 to maintain it in conduction.

As time progresses, the flow of current through resistor 42 increases to a value at which diode 48 is back biased into its Zener region by the voltage across resistor 42. Upon this occurrence, diode 48 falls to a low impedance and shunts base current from transistor 43, causing the latter to shut off. Since Zener diode 48 becomes a low impedance at a precisely predetermined voltage that is a function of the current and energy coupled to transformer 44 from source 23, it is possible to regulate the amount of current flowing from source 23 to transformer 45. Hence, the amounts of energy delivered to secondary winding 27 and to load impedance 28 are constant despite variations in the voltage of supply 23.

Reference is now made to FIGURE 6 of the drawings wherein a modification of the circuit of FIGURE 5 is illustrated. The circuit of FIGURE 6 is more efficient than that of FIGURE 5 because the power dissipating circuit of the latter is replaced by a saturable reactor network including winding 51 and magnetic core 52 having a rectangular B-H curve. Winding 51 is connected to tertiary 46 and the base of transistor 43 via current limiting resistors 53 and 54, respectively.

The reactor comprising winding 51 and core 52 is of the conventional type wherein a substantial voltage is developed across the winding terminals as long as the core is not saturated. Upon the application of a sufficient volt-second product to core 52, it becomes saturated so the voltage across the terminals of winding 51 drops substantially to zero.

In the present circuit, application of a trigger pulse from source 41 to forward bias the base-emitter junction of transistor 43 results in the application of voltage from source 23 to winding 44. In response to the suddenly induced voltage in winding 44, a magneto motive force is applied to core 52 from winding 51 via the inductive coupling established between windings 44 and 46. The energy coupled to core 52 from tertiary coil 46 drives the core towards saturation so that a high impedance exists across winding 51 and significant positive bias is applied to the emitter of transistor 43 relative to its base. Hence, transistor 43 conducts and couples energy from source 23 to winding 44 even after termination of trigger pulse 41. When the energy coupled to core 52 from winding 51 reaches the required number of volt seconds to saturate the core, the voltage and impedance across the winding 51 drop substantially. Hence, the forward base-emitter voltage of transistor 43 is removed, base current for transistor 43 is shunted through winding 51, the transistor is cut off, and power from source 23 is decoupled from primary winding 44. When transistor 43 is cut off, energy is coupled to the load in the same manner indicated supra, in connection with FIGURE 3.

Saturation of core 52 occurs only after a predetermined amount of energy has been stored in the magnetic field associated with transformer 45 so that the transformer stores the same amount of energy for each application of current from D.C. source 23 thereto. In consequence, the amount of energy coupled to load impedance 28 via pulse forming network 31 is invariable despite changes in the voltage of source 23.

As the cycle continues after transistor 43 is cut off, winding 46 is driven in the opposite direction to which it was driven while transistor 43 was conducting by its close coupling with winding 27. Hence, the current now flowing through winding 51 is opposite to that flowing before and core 52 is reset so it can properly regulate in response to the next pulse at the base of transistor 43.

Reference is now made to FIGURE 7 wherein the secondary of transformer 26 is split into two parts 61 and 62 between which is connected switching rectifier 29. The input circuitry of any of FIGURES 3, 5 and 6 may be connected to primary winding 25 while the output circuitry is conventional except for the connections of diode 29 and damping resistor 32. Because of the close coupling between windings 25, 61 and 62, resistance 32 may be connected across any of them, the showing across winding 62 being merely illustrative.

The operating cycle of FIGURE 7 is exactly as shown in FIGURES 4a to 4e, inclusive, prior to $t_4$. At $t_4$ the voltages across windings 61 and 62 are separately reduced to zero by the damping effects of resistance 32. The voltage at the top of coil 62 is reduced by critical damping to the value formerly at its bottom due to the discharge path through resistance 32 and the distributed capacitance of the winding. The voltage at the bottom of coil 61 increases to that formerly at the top of winding 61 because of the current supplied by PFN 23 to the distributed capacitance of the winding. Because the PFN 23 capacity is much greater than the distributed capacity of winding 61 virtually no voltage change occurs at the top of winding 61 at time $t_4$ and thereafter. The voltage wave across winding 61 is critically damped since the resistance of resistor 32 is reflected into winding 61 by the close coupling between windings 61 and 62.

By connecting diode 29 between windings 61 and 62 the effective distributed capacity of transformer 26 is reduced over the arrangements previously discussed. Hence, the value of resistor 32 necessary for critical damping at time $t_4$ of the secondary voltage wave, FIGURE 4d, is greater, resulting in less power dissipation and higher circuit efficiency.

Transformer capacitance is reduced by the circuit of FIGURE 7 over that of FIGURES 3, 5 and 6 since the total change in charge at all points in the transformer secondary above the midpoint is less. This may be seen by considering the upper end of the secondary winding in both cases. In FIGURE 3, the voltage, hence charge, between this point and the lower end of the secondary is maximum at $t_4$. After the voltage at the upper end of winding 27 is damped through resistance 32, the charge and voltage between the upper and lower ends of transformer are zero. Hence there is a maximum change in charge at the upper end of winding 27, causing a maximum effective value of capacitance there. In FIGURE 7, there is no D.C. path from the upper end of winding 61 at the time diode 29 cuts off, so the voltage and charge at this point remain constant during damping. Hence, there is no apparent capacitance at the top of winding 61. It should be apparent that in FIGURES 3 and 7 the distributed capacities at the center of the secondaries are equal and that the capacitances vary from the lower ends of the secondaries to the midpoints in identical manners. Since the capacitance in FIGURE 7 decreases from the midpoint to the upper end of the secondary while the converse is true in FIGURE 3, it follows that the effective capacitance of the latter exceeds that of the former.

Reference is now made to FIGURE 8 of the drawings wherein semiconductor diode 64 having a small junction and adapted to pass currents of approximately 300 ma. is poled identically with large junction diode 29 which typically passes about 2 amperes. By means of small, current limiting resistance 66, e.g. 18 ohms, diode 64 is connected to auxiliary winding 65, across which is developed a voltage considerably less than that of winding 27, e.g. 6 volts maximum, whereby the small diode can feed current from the cathode to the anode of diode 29. It is to be understood that the arrangement of FIGURE 8 can be utilized with any of FIGURES 3, 5, 6, and 7 by appropriately connecting the primary and secondary circuitry to windings 25 and 27, respectively. Regarding FIGURE 7, it is necessary to connect the anode of diode 29 to a suitable point below the top of winding 62, while resistance 66 is series connected with diode 64 to the top of winding 62.

The circuit of FIGURE 8 is employed for insuring current cut off in the secondary of transformer 26 precisely when the oscillating voltage reaches a maximum. In the circuit of FIGURE 3, for example, this does not generally happen because there is a significant charge at the large area junction of diode 29 to bias the anode positive when the oscillating current is zero. To overcome the bias and turn off diode 29, it is necessary for current to flow from its cathode to its anode in the next quarter cycle of the oscillating wave. This causes build up of the magnetic field stored in winding 27, FIGURE 3. The field collapses when the bias is finally overcome to produce undesirable transients in the circuit. According to the invention, the transient is prevented because the current is cut off precisely when the secondary voltage and current reach the maximum and zero points in the oscillating cycles, respectively.

According to FIGURE 8, as the quarter cycle between $t_3$ and $t_4$ progresses the voltage across resistor 66 increases causing diode 64 to take an increasing share of the total current through winding 27. When the current through diode 64 exceeds the total current through winding 27, as it must sometime before time $t_4$, reverse current through heavy duty diode 29 becomes available to remove charge stored therein and to facilitate turn-off.

While I have described and illustrated one specific embodiment of my invention, it will be clear that variations of the details of construction which are specifically illustrated and described may be resorted to without departing from the true spirit and scope of the invention as defined in the appended claims.

I claim:

1. In a circuit for alternately transferring energy from a D.C. voltage source to the magnetic field of an inductive device and from the magnetic field of the inductive device to the electric field of a capacitive device, so that the capacitive device may be selectively discharged to pulse a load without disturbing the energy transfer characteristic of the circuit from the D.C. voltage source to the inductive device, the improvement comprising means for transferring said energy from said source to said magnetic field of said inductive device, wherein said inductive device is a transformer having a primary winding and a pair of secondary windings, one of said secondary windings coupled to said capacitive device, said means including a switch coupling said source to said primary winding, said switch comprising a transistor having emitter, base, and collector electrodes, said emitter and collector electrodes connected in series circuit with said source and said primary winding, a trigger circuit for selectively energizing said switch to a conductive condition for transferring current from said source to said primary winding, and means coupled to the other of said secondary windings for rendering said switch non-conductive when the amount of energy stored in said magnetic field reaches a predetermined level, the last-named means including a zener diode connecting said base electrode of said transistor to said source, a current limiting resistor connecting said other secondary winding in parallel circuit with said zener diode.

2. In a circuit for alternately transferring energy from a D.C. voltage source to the magnetic field of an inductive device and from the magnetic field of the inductive device to the electric field of a capacitive device, so that the capacitive device may be selectively discharged to pulse a load without disturbing the energy transfer characteristics of the circuit from the D.C. voltage source to the inductive device, the improvement comprising means for transferring said energy from said source to said magnetic field of said inductive device, wherein said inductive device is a transformer having a primary winding and a pair of secondary windings, one of said secondary windings coupled to said capacitive device, said means including a switch coupling said source to said primary winding, said switch comprising a triode having current emitting, current collecting and control electrodes, said source coupled to said primary winding via said current emitting and current collecting electrodes, a trigger circuit for selectively energizing said switch to a conductive condition for transferring current from said source to said primary winding, and means coupled to the other of said secondary windings for rendering said switch non-conductive when the amount of energy stored in said magnetic field reaches a predetermined level, the last-named means comprising a saturable reactor, means including said saturable reactor connecting said control electrode to said source, and means connecting said other secondary winding in parallel circuit with said saturable reactor.

References Cited by the Examiner

UNITED STATES PATENTS

| | | | |
|---|---|---|---|
| 2,439,223 | 4/1948 | Schade | 307—108 |
| 2,867,735 | 1/1959 | Kaufman | 307—88.5 |
| 2,914,683 | 11/1959 | Terry | 307—88.5 |
| 3,131,327 | 4/1964 | Quinn | 315—209 |
| 3,187,198 | 6/1965 | Lewis | 307—88.5 |
| 3,196,369 | 7/1965 | Darden et al. | 307—88.5 |
| 3,237,052 | 2/1966 | Sokolov | 315—241 |

ARTHUR GAUSS, *Primary Examiner.*

J. ZAZWORSKY, *Assistant Examiner.*